United States Patent
Ueda et al.

(10) Patent No.: US 9,239,115 B2
(45) Date of Patent: Jan. 19, 2016

(54) GLAND PACKING AND PACKING SET

(71) Applicants: Takahisa Ueda, Osaka (JP); Masaru Fujiwara, Osaka (JP); Katsunori Sugita, Osaka (JP); Hiroki Tanabe, Osaka (JP); Kodai Inoue, Osaka (JP); Hiroyoshi Nakamitsu, Osaka (JP)

(72) Inventors: Takahisa Ueda, Osaka (JP); Masaru Fujiwara, Osaka (JP); Katsunori Sugita, Osaka (JP); Hiroki Tanabe, Osaka (JP); Kodai Inoue, Osaka (JP); Hiroyoshi Nakamitsu, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 174 days.

(21) Appl. No.: 13/669,658

(22) Filed: Nov. 6, 2012

(65) Prior Publication Data

US 2013/0154198 A1   Jun. 20, 2013

(30) Foreign Application Priority Data

Nov. 9, 2011   (JP) .................................. 2011-245197

(51) Int. Cl.
| | |
|---|---|
| *F16J 15/22* | (2006.01) |
| *F16J 15/20* | (2006.01) |
| *D04C 1/12* | (2006.01) |
| *D04C 3/04* | (2006.01) |

(52) U.S. Cl.
CPC . *F16J 15/20* (2013.01); *D04C 1/12* (2013.01); *D04C 3/04* (2013.01); *F16J 15/22* (2013.01); *D10B 2403/0311* (2013.01); *D10B 2505/06* (2013.01)

(58) Field of Classification Search
CPC ....................................................... F16J 15/16
USPC ........................................... 277/510, 534, 537
See application file for complete search history.

(56) References Cited

U.S. PATENT DOCUMENTS

| | | | |
|---|---|---|---|
| 73,454 A | 1/1868 | Miller | |
| 1,246,089 A | 11/1917 | Greenoe | |
| 1,321,930 A | 11/1919 | McClure | |
| 1,601,381 A | 8/1924 | Thompson | |
| 1,847,216 A | 3/1932 | Hubbard | |
| 3,341,211 A | 9/1967 | Houghton et al. | |
| 5,549,306 A * | 8/1996 | Ueda | 277/537 |
| 6,568,689 B1 * | 5/2003 | Fujiwara et al. | 277/529 |
| 7,086,650 B2 * | 8/2006 | Fujiwara et al. | 277/537 |
| 7,448,631 B2 * | 11/2008 | Shimizu et al. | 277/537 |
| 2003/0184024 A1 | 10/2003 | Fujiwara et al. | |

FOREIGN PATENT DOCUMENTS

| | | |
|---|---|---|
| EP | 1 193 428 | 4/2002 |
| JP | 49-034917 | 9/1974 |
| JP | 59-106763 | 6/1984 |

(Continued)

*Primary Examiner* — Gilbert Lee

(74) *Attorney, Agent, or Firm* — Clark & Brody

(57) ABSTRACT

A gland packing provided in a fluid apparatus such as a pump and compressed in an axial direction so as to prevent penetration leakage of a fluid is provided.

The gland packing has a packing base material 11 of a predetermined length including a band-like flat braid 12 braided by moving a plurality of yarns 13 along one track K. The band-like packing base material 11 is shaped into a ring by abutting longitudinal ends 12a and 12b of the packing base material 11 so that a width direction thereof is parallel with a packing axial direction, and is then compressed in the axial direction, whereby the packing base material 11 is overlappedly folded in a packing axial direction, with a longitudinal direction of the packing base material 11 as a direction of folding lines 14.

5 Claims, 8 Drawing Sheets

(56) References Cited

FOREIGN PATENT DOCUMENTS

| JP | 63-180771 | 11/1988 |
| JP | 04-025671 | 1/1992 |
| JP | 05-1188444 | 5/1993 |
| JP | 06-027546 | 4/1994 |
| JP | 06-201050 | 7/1994 |
| JP | 06-201051 | 7/1994 |

* cited by examiner

| | COMPRESSION PERCENTAGE | RESTORE PERCENTAGE |
|---|---|---|
| EXAMPLE | 19.1% | 5.0% |
| CONVENTIONAL EXAMPLE | 34.3% | 3.7% |

$$\text{COMPRESSION PERCENTAGE}(\%) = \frac{(A_0 - A_1)}{A_0} \times 100$$

$$\text{RESTORE PERCENTAGE}(\%) = \frac{(A_2 - A_1)}{(A_0 - A_1)} \times 100$$

|  | TIGHTENING PRESSURE TRANSMISSION CHARACTERISTIC | TIGHTENING PRESSURE CONVERSION CHARACTERISTIC |
|---|---|---|
| EXAMPLE | 85.5% | 68.1% |
| CONVENTIONAL EXAMPLE | 70.2% | 55.3% |

$$\text{TRANSMISSION CHARACTERISTIC (\%)} = \frac{f}{F} \times 100$$

$$\text{CONVERSION CHARACTERISTIC (\%)} = \frac{P}{F} \times 100$$

GLAND PACKING AND PACKING SET

TECHNICAL FIELD

The present invention relates to a gland packing and a packing set.

BACKGROUND ART

For example, as sealing devices for use in pumps and valves, gland packings are known. As shown in FIG. 8, gland packings 93 are provided in annular space A between a housing 91 and a shaft 92 of a pump, and are sandwiched in an axial direction between a step 95 on an inner peripheral side of the housing 91 and a tubular tightening member 94 on an atmospheric side of the housing 91.

When the tightening member 94 is tightened to a fluid 99 side (inwardly in the axial direction) by a bolt 96, the gland packings 93 are compressed in the axial direction. While being further compressed, the gland packings 93 are closely contacted onto an inner peripheral surface 91a of the housing 91 and an outer peripheral surface 92a of the shaft 92. This can prevent the fluid 99 in the housing 91 from being leaked to the atmospheric side.

As such a gland packing, a packing having a band-like packing base material which is helically wound plural times is known (refer to Japanese Unexamined Patent Publication No. 6-201050 (see FIG. 1), for example). Further, the gland packing is formed with folded portions at axial ends of the packing base material layers overlapped in a diametrical direction. Penetration leakage in which a fluid enters into and passes through between the layers from axial end faces can thus be prevented.

CITATION LIST

Patent Literature

Patent Literature 1: Japanese Unexamined Patent Publication No. 6-201050

SUMMARY OF INVENTION

Technical Problem

As described above, the gland packings 93 in the annular space A are collapsed in the axial direction by the tightening member 94. In this case, in the gland packing described in Japanese Unexamined Patent Publication No. 6-201050, the packing base material layers overlapped in the diametrical direction can be separated from each other with time to pass the fluid through between the layers. The effect of preventing the penetration leakage can be lowered.

Accordingly, an object of the present invention is to provide a gland packing and a packing set provided in a fluid apparatus such as a pump and compressed in an axial direction so as to prevent penetration leakage of a fluid.

Solution to Problem

A gland packing of the present invention has a packing base material of a predetermined length including a band-like flat braid braided by moving a plurality of yarns along one track, wherein the packing base material is compressed and overlappedly folded in a width direction thereof.

According to the present invention, in the gland packing, the band-like packing base material is compressed and overlappedly folded in the width direction thereof. Thus, even when the gland packing is compressed (collapsed) in the axial direction, overlappedly folded portions are closely contacted onto each other more and more. For this, the penetration leakage can be prevented to obtain high sealing ability. Further, when the packing base material including the flat braid is overlappedly folded and compressed, the yarns are compressed onto each other. As a result, a fluid is less likely to pass through between the yarns to obtain high sealing ability.

In addition, preferably, the packing base material is shaped into a ring and is overlappedly folded in a packing axial direction, with a longitudinal direction thereof as a direction of folding lines.

In this case, even when the gland packing is compressed (collapsed) in the axial direction, the packing base material overlappedly folded in the packing axial direction cannot be separated in the diametrical direction, so that the overlappedly folded portions are closely contacted onto each other more and more. For this, the penetration leakage can be prevented to obtain high sealing ability. Further, when the packing base material including the flat braid is overlappedly folded and compressed in the packing axial direction, the yarns are compressed onto each other. As a result, the fluid is less likely to pass through between the yarns to obtain high sealing ability.

Further, preferably, the packing base material has at least two folding lines, and is overlappedly folded in its entirety.

In this case, the packing base material is overlappedly folded at least three times in the packing axial direction. The compression allowance (deformation amount) in the axial direction in the entire gland packing can thus be increased. With the increased compression allowance in the axial direction, the gland packing is greatly deformed in the diametrical direction. The contact pressure of the gland packing onto a shaft on the inner peripheral side and a housing on the outer peripheral side becomes high. The sealing ability can thus be further enhanced.

A packing set of the present invention has a plurality of gland packings in the packing axial direction.

According to the present invention, the plurality of gland packings are aligned in the axial direction in an annular space between the shaft and the housing of the pump, for example. According to the packing set, high sealing ability can be obtained.

In addition, in the packing set, preferably, abutted longitudinal ends of the packing base materials of a pair of gland packings adjacent to each other in the axial direction are apart from each other in the circumferential direction about the center line of the packings.

The longitudinal ends of the packing base materials are abutted to shape the gland packings into a ring, so that between the ends, the fluid is likely to be leaked. However, with the arrangement, leakage of the fluid can be prevented in the entire packing set. For example, the abutted ends of the pair of the gland packings adjacent to each other in the axial direction are apart at 180° from each other in the circumferential direction about the center line of the packings.

Advantageous Effects of Invention

According to the gland packing of the present invention, even when the gland packing is provided in a fluid apparatus such as a pump and is compressed in the axial direction, the packing base material overlappedly folded in the packing axial direction cannot be separated in the diametrical direction, so that the overlappedly folded portions are closely contacted onto each other more and more. The penetration leakage can thus be prevented to obtain high sealing ability.

In addition, according to the packing set of the present invention, the plurality of gland packings are aligned in the axial direction to obtain high sealing ability.

DESCRIPTION OF EMBODIMENTS

Figure 1:
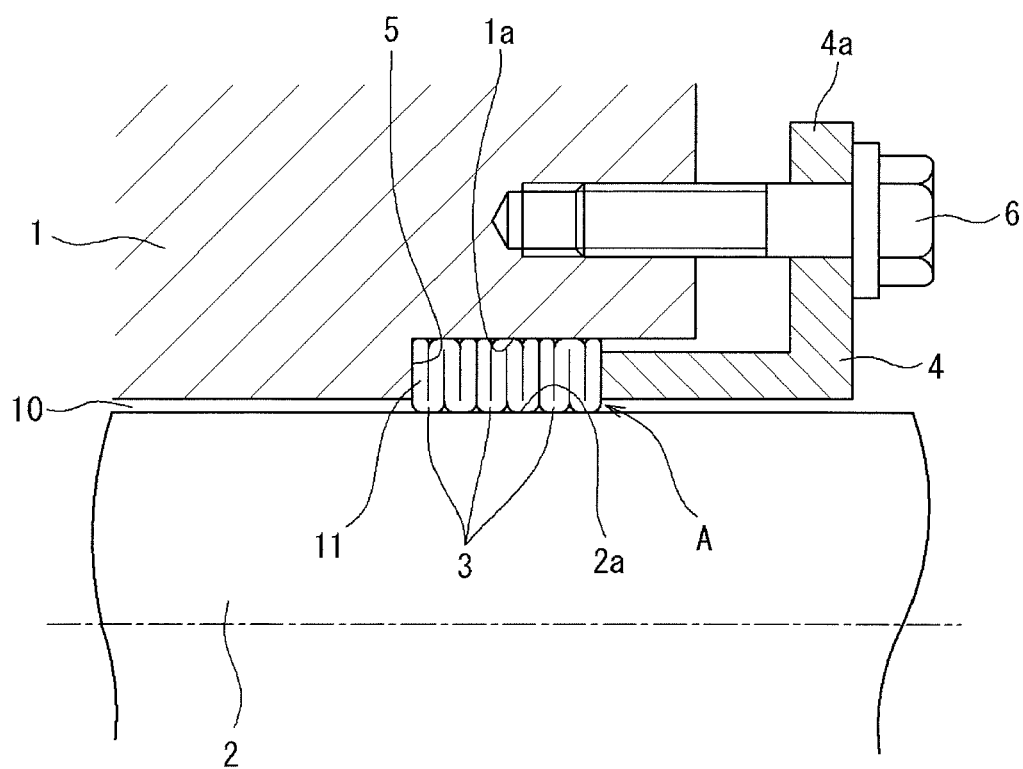
FIG. 1 is a cross-sectional view of part of a fluid apparatus in which gland packings of the present invention are used as sealing devices.

FIG. 1 is a cross-sectional view of part of a fluid apparatus in which gland packings of the present invention are used as sealing devices. The fluid apparatus is a valve or a pump, and has a housing 1 and a shaft 2 in the internal space of the housing 1.

In annular space A between the housing 1 and the shaft 2, gland packings 3 are aligned in the axial direction. In this embodiment, three gland packings 3 are aligned and form a packing set. The shaft 2 is rotated about the center line of the shaft 2, and is reciprocated in the axial direction.

On the atmospheric side (outwardly in the axial direction) of the annular space A, a tubular tightening member 4 with a flange 4a is provided. The gland packings 3 are sandwiched in the axial direction between the tightening member 4 and a step 5 on the inner peripheral side of the housing 1. The step 5 and an inner peripheral surface 1a of the housing 1 and an outer peripheral surface 2a of the shaft 2 form a packing box. The inside of the packing box is the annular space A. The gland packings 3 are provided in the packing box.

When the tightening member 4 is tightened to a fluid 10 side (inwardly in the axial direction) by a bolt 6, the gland packings 3 are compressed (collapsed) in the axial direction. While being further compressed, the gland packings 3 are closely contacted onto the inner peripheral surface 1a of the housing 1 and the outer peripheral surface 2a of the shaft 2. This can prevent the fluid 10 in the housing 1 from being leaked to the outside (atmospheric side) even when the shaft 2 is rotated and is reciprocated in the axial direction. The housing 1, the shaft 2, the tightening member 4, and the bolt 6 are made of metal.

The three gland packings 3 are all the same. Each of the gland packings 3 has a packing base material 11 of a predetermined length. The packing base material 11 is shaped into a ring, and is then compressed in a predetermined cross-sectional shape. The shaping process of the gland packing 3 is shown in FIGS. 2A to 2C.

Figure 2A:
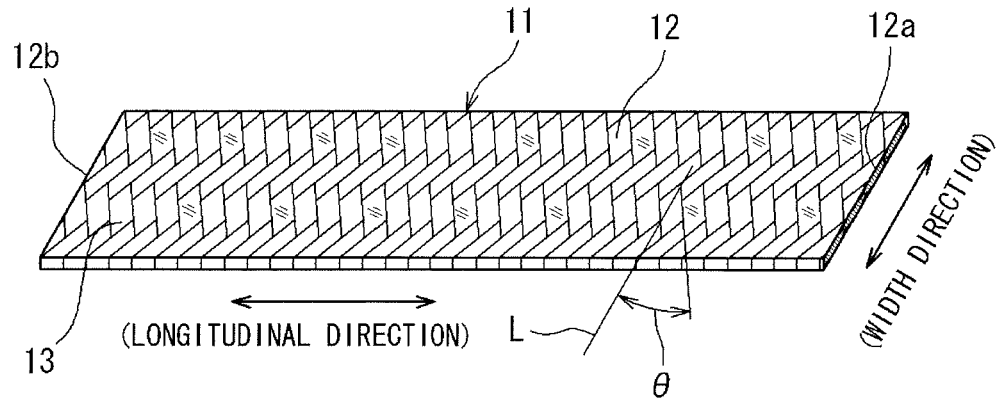
FIGS. 2A, 2B, and 2C are explanatory views showing a process for compressing each gland packing.

As shown in FIG. 2A, the packing base material 11 includes a band-like flat braid 12 formed by braiding a plurality of yarns 13. The flat braid 12 is braided by moving the yarns 13 along one track, which will be described later.

Figure 2B:
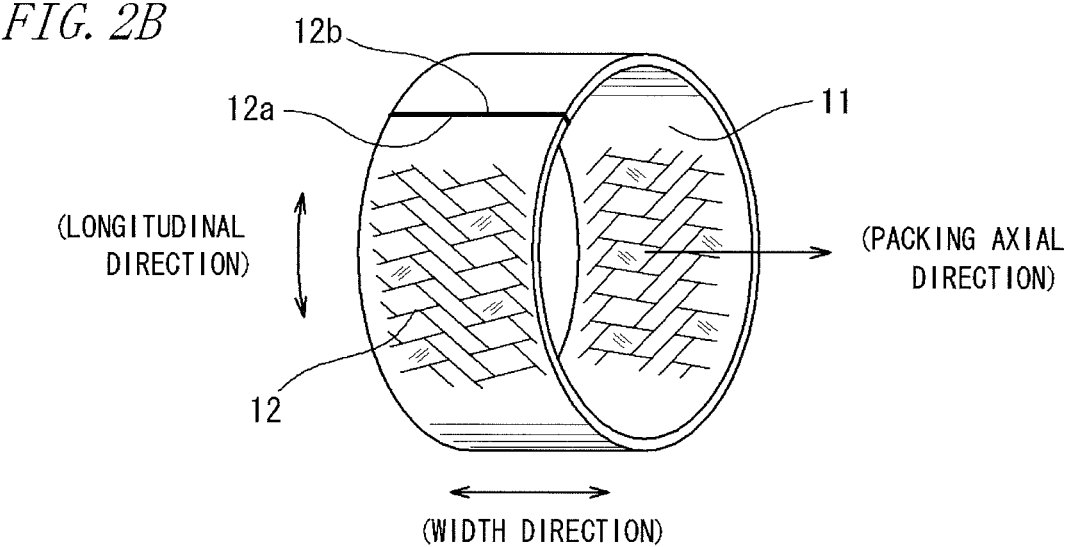
Figure 2C:
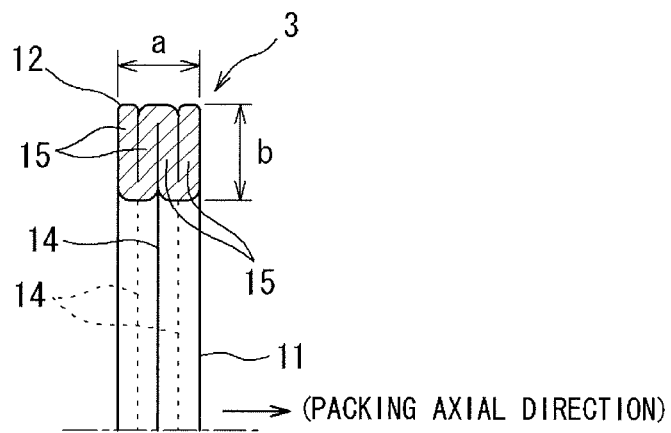

As shown in FIG. 2B, the band-like packing base material 11 is shaped into a ring by abutting longitudinal ends 12a and 12b of the packing base material 11 so that the width direction of the packing base material 11 is parallel with the packing axial direction. Then, the ring-shaped packing base material 11 is compressed in the width direction. As shown in FIG. 2C, the packing base material 11 is overlappedly folded in the packing axial direction, with the longitudinal direction (circumferential direction) of the flat braid 12 as the direction of folding lines 14.

In this embodiment, the packing base material 11 has three folding lines 14, and is overlappedly folded in its entirety. After compressed, one band-like packing base material 11 has four overlappedly folded portions 15 in the axial direction.

For example, the band-like packing base material 11 having a width of 10 mm and a thickness of 1.5 mm is shaped into a ring, and is then compressed in the width direction. Hence, the gland packing 3 has an inside diameter of 9 mm, an outside diameter of 14 mm, and an axial dimension of 2.5 mm.

Figure 3:
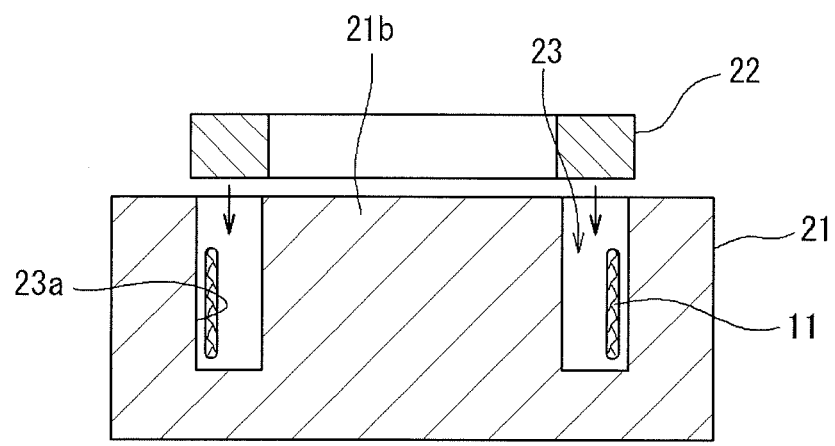
FIG. 3 is an explanatory view for compressing each gland packing by using dies.

As shown in FIG. 3, the compression is performed by a first die 21 and a second die 22. That is, the ring-shaped packing base material 11 is placed in an annular recessed groove 23 of the first die 21. Only one ring-shaped packing base material 11 is arranged in a region toward a diametrical outer side surface 23a of the annular recessed groove 23.

Then, the packing base material 11 is compressed in the axial direction by the second die 22. With this, as shown in FIG. 2C, the packing base material 11 is overlappedly folded, with the longitudinal direction thereof as the direction of the folding lines 14. In addition, the inner peripheral surface of the gland packing 3 obtained by compressing the packing base material 11 in the axial direction is corrected by the outer peripheral surface of a shaft 21b of the first die 21. In addition, the outer peripheral surface of the gland packing 3 is corrected by the diametrical outer side surface 23a of the annular recessed groove 23. As shown in FIG. 2C, the cross section of the gland packing 3 is shaped to be in a substantially rectangular shape (b by a).

In this way, three gland packings 3 are previously shaped into a ring so as to be compressed by the dies 21 and 22. As shown in FIG. 1, the three gland packings 3 are inserted and aligned in the annular space A along the axial direction. Then, the gland packings 3 are used in a state of being compressed in the axial direction by the tightening member 4, the step 5, and the bolt 6.

About a Second Embodiment

In the first embodiment, the packing base materials 11 are compressed by the dies 21 and 22 (see FIG. 3) outside the fluid apparatus such as a pump to form the gland packings 3 in a predetermined shape, and then, the gland packings 3 are provided in the packing box (annular space A) of the fluid apparatus.

In a second embodiment, the band-like packing base materials 11 of a predetermined length are compressed inside the fluid apparatus to obtain the gland packings 3.

That is, the band-like packing base material 11 of a predetermined length (the first packing base material 11) may be shaped into a ring by abutting the longitudinal ends 12a and 12b of the packing base material 11 so that the width direction thereof is parallel with the packing axial direction (the state of FIG. 2B), and may be then provided in the packing box (annular space A) of the fluid apparatus such as a pump so as to be compressed in the width direction. In the compression, the step 5 and the inner peripheral surface 1a of the housing 1 (see FIG. 1) and the outer peripheral surface 2a of the shaft 2 are used instead of the first die 21 of FIG. 3. In addition, the tightening member 4 is used instead of the second die 22 of FIG. 3. The packing base material 11 is compressed in the axial direction by the tightening member 4 and the bolt 6.

With this, one ring-shaped gland packing 3 is formed by the first packing base material 11. Subsequently, like the first gland packing 3, the second packing base material 11 is shaped into a ring so as to be provided in the packing box (annular space A), and is then compressed in the width direction. Thereby, the two gland packings 3 are aligned in the axial direction in the annular space A of the fluid apparatus such as a pump. Further, likewise, the third packing base material 11 is shaped into a ring so as to be provided in the packing box (annular space A), and is then compressed in the width direction. Thereby, the three gland packings 3 are aligned in the axial direction in the annular space A.

Figure 4:
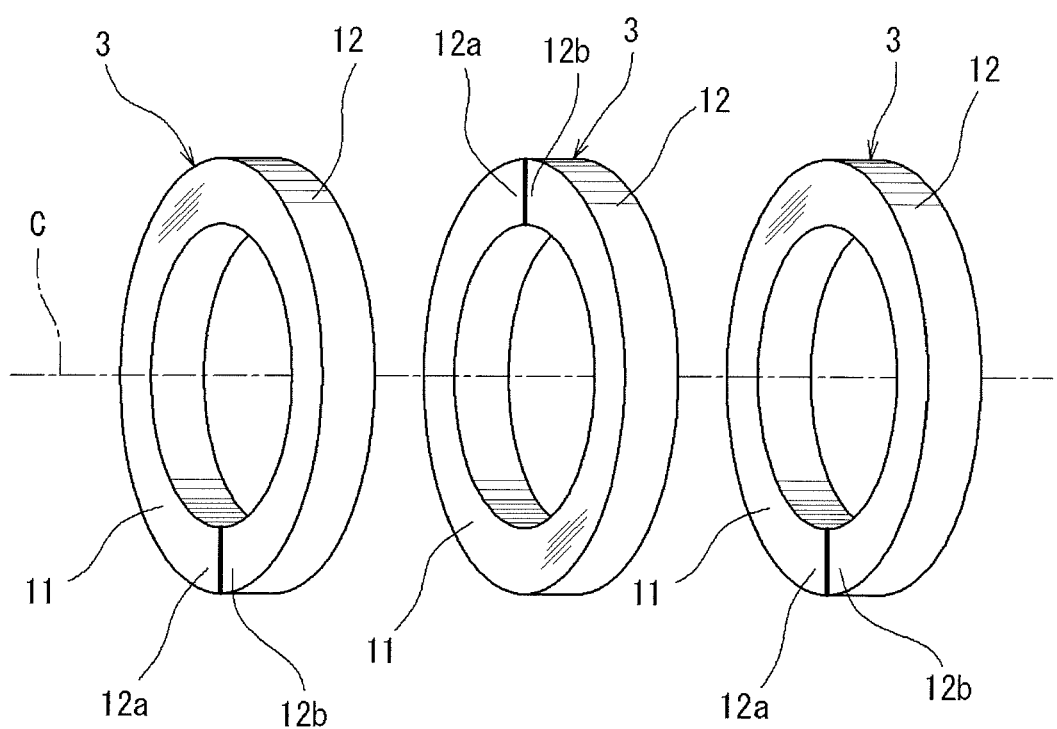
FIG. 4 is an explanatory view of an arrangement of abutted ends of the gland packings.

In addition, in both of the first and second embodiments, as shown in FIG. 4, the abutted longitudinal ends 12a and 12b (hereinafter, called abutted ends 12a and 12b) of the packing base materials 11 of a pair of gland packings 3 and 3 adjacent to each other in the axial direction are apart from each other in the circumferential direction about center line C of the packings. That is, in FIG. 4, the abutted ends 12a and 12b of the left gland packing 3 are located in the lower portion thereof, but the abutted ends 12a and 12b of the center gland packing 3 adjacent to the left gland packing 3 are located in the upper portion thereof. The abutted ends 12a and 12b of the right gland packing 3 are located in the lower portion thereof.

In this way, the abutted ends 12a and 12b of the pair of the gland packings 3 and 3 adjacent to each other in the axial direction are apart at 180° from each other in the circumferential direction about center line C of the packings. In both of the first and second embodiments, the ends 12a and 12b of the packing base material 11 are abutted to shape the gland packing 3 into a ring. The fluid is thus likely to be leaked from between the ends 12a and 12b. However, with the arrangement shown in FIG. 4, the fluid can be prevented from being leaked in the entire packing set. The abutted ends 12a and 12b should be set to an interval therebetween in the circumferential direction of 90° or the like other than 180° so as not to coincide with each other in the circumferential direction about center line C of the gland packings.

[About the Flat Braid 12 and the Yarn 13]

Figure 5A:
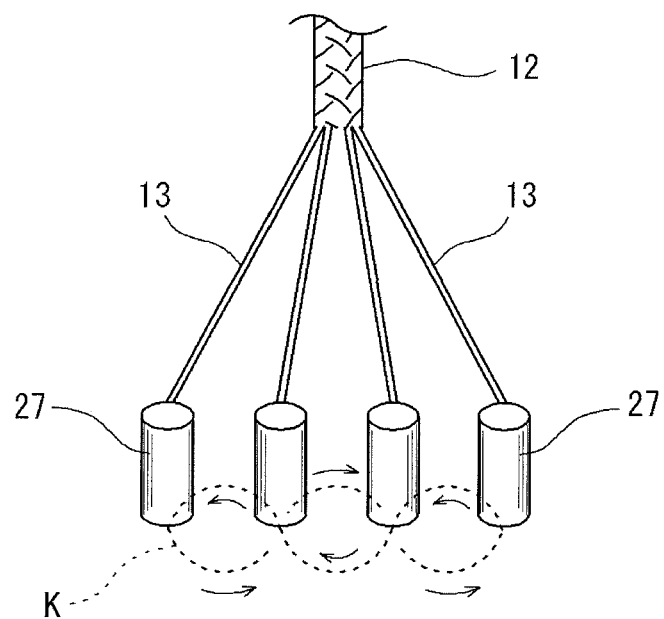
FIG. 5A is an explanatory view of part of a braiding machine and a flat braid braided by the braiding machine.

The flat braid 12 is braided by moving a plurality of yarns 13 along one track (path). FIG. 5A is an explanatory view of part of a braiding machine and the flat braid 12 braided by the braiding machine. The braiding machine has spindles 27 equal in number to that of the yarns 13 (in this embodiment, four). The spindles 27 each feed each yarn 13 by holding the yarn 13. The spindles 27 can be led and moved along wavy track K. The four spindles 27 cross each other to braid the yarns 13 therefrom. The track for the four spindles 27 is one track K, and the yarns 13 are braided by being moved along the track K. The dashed line of FIG. 5A indicates the track K. Arrows along the track K indicate the moving path of the spindles 27 (the yarns 13).

Figure 5B:
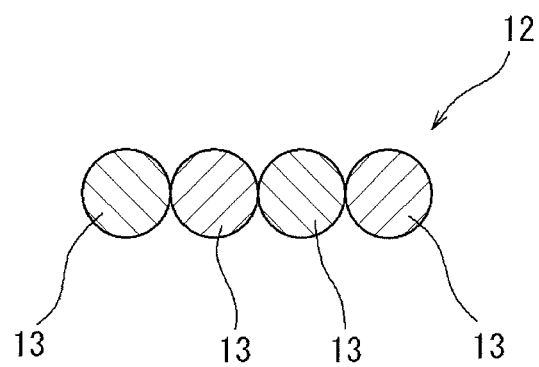
FIG. 5B is a diagram showing the transverse cross section of the flat braid.

From the above, one yarns 13 is braided with other yarns 13 up and down, and the yarns 13 are braided so as to cross each other. This is repeated to obtain the flat braid 12. The flat braid 12 is made by braiding the yarns 13 along one surface (or along a plane). The yarns 13 are arranged in plan in transverse cross section, as shown in FIG. 5B, to form one braid. The flat braid 12 is thus thin and band-like. In FIGS. 5A and 5B, for simple description, the number of yarns 13 is small. However, the number of the yarns 13 is changed according to the necessary width of the flat braid 12.

According to the flat braid 12, the yarns 13 are inclined to the longitudinal direction and the width direction of the flat braid 12. In FIG. 2A, the straight portions of the yarns 13 are inclined at angle θ to straight line L in the width direction.

Angle θ is set to 20°≤θ≤55°. When θ is smaller than 20°, the width of the flat braid 12 becomes larger to tightly cross the yarns 13 each other. Consequently, a large stress is necessary for overlappedly folding the packing base material 11, with the longitudinal direction thereof as the folding lines 14, resulting in the overlapped folding being difficult. When θ is larger than 55°, the width of the flat braid 12 becomes smaller to roughly cross the yarns 13 each other. Hence, even with the overlappedly folded structure, the sealing ability of the sealed fluid is lowered. In particular, θ is preferably set to 30°≤θ≤45°.

The yarn 13 will be described. The yarn 13 used in the conventional gland packing can be used in the gland packing 3 of the embodiments. For example, examples of the yarn 13 include a fluororesin fiber, a graphite-loaded fluororesin fiber, an aramid fiber, and a fire-resistant fiber obtained by carbonizing an acrylic fiber. These fibers are appropriately selected according to the use conditions, and are used singly or in combination so as to form the flat braid.

Further, an expanded graphite yarn having an expanded graphite material and a reinforcing yarn reinforcing the expanded graphite material from the inside or outside thereof is also used. In more detail, an expanded graphite yarn of the inside reinforcing type, such as an expanded graphite material alone having in the longitudinal direction thereof a reinforcing material including thin metal wires such as thin stainless steel wires and thin inconel wires and aramid fibers, a yarn formed to be string-like by overlappedly folding those materials in an S-shape, or a yarn formed to be string-like by twisting those materials can be used.

In addition, an expanded graphite yarn of the outside reinforcing type, such as an expanded graphite yarn in which a tubular body is formed by knitting thin metal wires such as thin stainless steel wires and thin inconel wires and aramid fibers, and fibrous expanded graphite materials whose ends are dislocated from each other are then inserted into the tubular body, or an expanded graphite yarn in which an expanded graphite material is overlappedly folded in an S-shape to be string-like and the outer periphery thereof is then reinforced by braiding thin metal wires such as thin stainless steel wires and thin inconel wires and aramid fibers can also be used.

The yarn used in the present invention may be appropriately selected according to the use conditions of the gland packing from among the fluororesin fiber, the graphite-loaded fluororesin fiber, the aramid fiber, the fire-resistant fiber obtained by carbonizing the acrylic fiber, and the expanded graphite yarns, and these fibers may be used, not only singly, but also in combination.

The flat braid 12 is different from a knitted material formed by knitting yarns. In knitting, one loop of a yarn is formed, so that into the loop, the next loop is inserted and is then pulled out from thereunder, which is continued. When the gland packing includes the knitted material, the yarns are complicatedly bent and cross each other therein, which limits the material of the yarns to be applied. In addition, since the yarns are complicatedly bent and cross each other, the gland packing is easily deformed. However, a gap is likely to be caused between the yarns, with the result that it is difficult to enhance the sealing ability.

[About the Function of the Gland Packing 3]

In the gland packing 3 according to the first and second embodiments, as shown in FIGS. 2A to 2C, the band-like packing base material 11 is shaped into a ring by abutting the longitudinal ends 12a and 12b so that the width direction thereof is parallel with the packing axial direction, and is then compressed in the width direction, so that the packing base material 11 is overlappedly folded plural times in the packing axial direction, with the longitudinal direction thereof as the direction of the folding lines 14.

According to the gland packing 3, one packing base material 11 of a predetermined length including the band-like flat braid 12 is overlappedly folded in the axial direction so as to be provided in the pump. The gland packing 3 in the pump is then collapsed in the axial direction by the tightening member 4 (see FIG. 1). In this case also, the packing base material 11 overlappedly folded in the packing axial direction cannot be separated in the diametrical direction, so that the overlappedly folded portions 15 are closely contacted onto each other more and more. For this, the penetration leakage in which the fluid passes through between the packing base materials 11 can be prevented, thereby obtaining high sealing ability.

Further, when the packing base material 11 including the flat braid 12 is overlappedly folded and compressed in the packing axial direction, the yarns 13 are compressed onto each other. As a result, the fluid is less likely to pass through between the yarns 13 to obtain high sealing ability.

That is, the yarns 13 in the flat braid 12 are inclined in the same direction to the longitudinal direction of the flat braid 12 (packing base material 11) (see FIG. 2A). When the packing base material 11 is overlappedly folded as described above (the state of FIG. 2C), the yarns 13 cross each other on the mating surfaces of the overlappedly folded portions 15. Therefore, the fluid is less likely to be leaked to obtain high sealing ability.

On the contrary, in order that the packing base material is band-like, the packing base material is considered to include a woven material having warp yarns and weft yarns. However, when the woven material is shaped into a ring by abutting the ends thereof so that the width direction thereof is parallel with the packing axial direction and is then compressed in the width direction to form the gland packing, the longitudinal direction of the weft yarns coincides with the axial direction of the annular space A (see FIG. 1) of the valve, for example. Therefore, even when the gland packing is compressed in the axial direction, the weft yarns are less likely to be compressed onto each other, so that the overlapped folded structure is less likely to be uniform. Consequently, the fluid is likely to be leaked along the weft yarns (or through between the weft yarns). In this case, although the warp yarns are compressed onto each other, a gap extending in the axial direction is caused between the warp yarns due to the presence of the weft yarns. As a result, the penetration leakage of the fluid can be allowed.

In addition, in the embodiments, the packing base material 11 includes the flat braid, so that the yarns 13 extend along the direction inclined to the longitudinal direction of the packing base material 11. For this, since the yarns 13 are inclined to the longitudinal direction and the width direction of the packing base material 11, the flat braid has a longer fluid passage than the woven material. Hence, the fluid flowing along the yarns 13 is less likely to be leaked. Further, the packing base material 11 is easily bent, and is likely to be deformed into a predetermined shape when compressed. As a result, the gland packing 3 has improved contactivity thereof onto the outer peripheral surface 2a of the shaft 2 and the inner peripheral surface 1a of the housing 1 to have high sealing ability.

In particular, in the embodiments, the packing base material 11 has three folding lines 14, and is overlappedly folded in its entirety. The compression allowance (deformation amount) in the axial direction in the entire gland packing 3 can thus be increased. When the compression allowance in the axial direction is increased, the gland packing 3 is greatly deformed in the diametrical direction. The contact pressure of the gland packing 3 onto the shaft 2 on the inner peripheral side and the housing 1 on the outer peripheral side becomes high. The sealing ability can thus be further enhanced. The packing base material 11 preferably has at least two folding lines 14. However, the packing base material 11 may have three folding lines 14 or four or more folding lines 14, in addition to two folding lines 14, and may be overlappedly folded in its entirety.

Further, the gland packing 3 of the embodiments is formed by overlappedly folding the thin band-like packing base material 11 according to the shape of annular space A so as to have a predetermined cross-sectional shape. In addition, the gland packing 3 can have various aspect ratios in cross section. In the gland packing including, as the packing base material, a circular braid and a square braid, not the flat braid 12, it is difficult to reduce the cross-sectional size. However, according to the embodiments, the cross-sectional size can also be reduced.

In addition, in the gland packing including, as the packing base material, the circular braid and the square braid, to reduce the cross-sectional size, the number of yarns is considered to be reduced. However, in this case, a large number of gaps are caused in the gland packing to lower the sealing ability. In the embodiments, since the flat braid is used as the packing base material, three or more yarns capable of forming the flat braid can make the flat braid have no gaps between the crossing yarns even when the number of yarns is reduced. Therefore, the sealing ability cannot be lowered.

In addition, the gland packing 3 including the flat braid 12 can be smaller by using a small number of thick yarns 13. A tightly braided structure can be obtained on the outer peripheral surface and the inner peripheral surface of the compressed gland packing 3. Further, the sealing ability can be improved with less surface irregularity. The yarns 13 are braided so as to cross each other, so that the flat braid 12 is strong. The gland packing 3 including the flat braid 12 has improved durability and wear resistance.

EXAMPLES

As Example, rectangular expanded graphite materials having a thickness of 0.38 mm, a width of 1 mm, and a length of 200 mm were inserted into a tubular portion formed by knitting metal threads (inconel wires having a wire diameter of 0.1 mm) as a reinforcing material while the ends of the expanded graphite materials were dislocated from each other, thereby making the yarn 13 in which the weight ratio between the expanded graphite materials and the metal threads was 7:3. As shown in FIG. 2A, the yarns 13 were braided to form the flat braid 12. The flat braid 12 was shaped into a ring, and was then compressed by the dies 21 and 22 (see FIG. 3) to make the gland packing 3. In Example, four yarns 13 having a diameter of 1.3 mm were used to make the band-like flat braid 12 having a thickness of 1.5 mm and a width of 10 mm. The flat braid 12 was cut into a length of 40 mm so as to be used as the packing base material 11. The gland packing 3 obtained by compressing the packing base material 11 (see FIG. 2C) had an outside diameter of 14 mm, an inside diameter of 9 mm, and an axial dimension of 2.5 mm, and had a substantially rectangular cross section. In addition, the compressed gland packing 3 had a density of 1.9 g/cm$^3$.

On the contrary, as Conventional Example, the square braid was made by the same four yarns as Example, and then, with the square braid, the packing base material having a cross-sectional dimension of 4 mm×4 mm and a length of 40 mm was made. In the same manner as Example, as Comparative Example, the packing base material was compressed by the dies 21 and 22 to make the gland packing having a rectangular cross section. The gland packing had the same outside diameter, inside diameter, and axial dimension as Example. The gland packing had a density of 1.75 g/cm$^3$. The shaping contact pressure for pressing the packing base material was the same in Example and Conventional Example.

A test for comparing the performance in Example and Conventional Example was conducted. The compression and restore characteristics of the gland packing will be described with reference to FIG. 6. Each of the gland packings in Example and Conventional Example was provided in a test machine which reproduces annular space A between the housing 1 and the shaft 2 shown in FIG. 1, and was then compressed by a member having the same function as the tightening member 4 of FIG. 1. It should be noted that one gland packing was used.

In the test, each of the gland packings in Example and Conventional Example was tightened at a contact pressure of 58.8 N/mm$^2$ from the unloaded state, and was then brought into the unloaded state, thereby measuring the compression percentage and the restore percentage of the gland packing.

Figure 6:
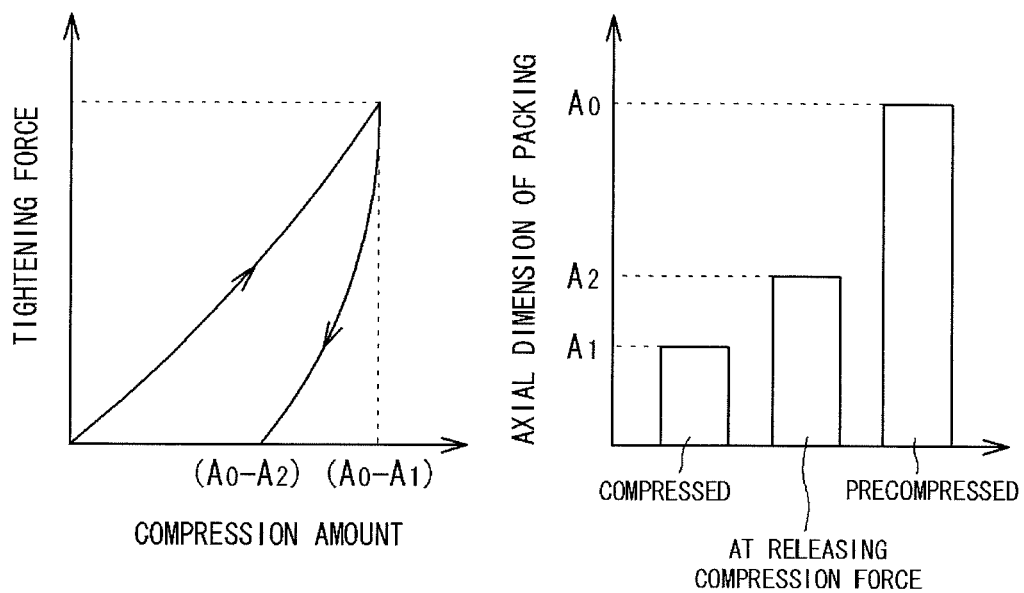
FIG. 6 shows a table, graphs, and equations of assistance in explaining a test conducted for comparing the compression and restore characteristics in Example and Conventional Example.

The compression percentage is calculated by the equation shown in FIG. 6 in which A0 is axial dimension a of the precompressed gland packing (see FIG. 2C) and A1 is axial dimension a of the gland packing which is tightened at the contact pressure. The restore percentage is calculated by the equation shown in FIG. 6 in which A2 is the axial dimension of the gland packing which is tightened at the contact pressure and is then brought into the unloaded state.

The compression percentage is 19.1% in Example, and is 34.3% in Conventional Example. The restore percentage is 5.0% in Example, and is 3.7% in Conventional Example. That is, the compression percentage is lower in Example than in Conventional Example, so that Example is less likely to be deformed. That is, the gland packing in Example is stronger and has higher rigidity than Comparative Example.

For this, according to the gland packing in Example, for example, part thereof can be prevented from being projected from the region in which the gland packing is to be essentially present (packing box). The density of the gland packing is increased according to the tightening force of the gland packing by the tightening member 4. Therefore, the predetermined sealing ability can be ensured.

Figure 7:
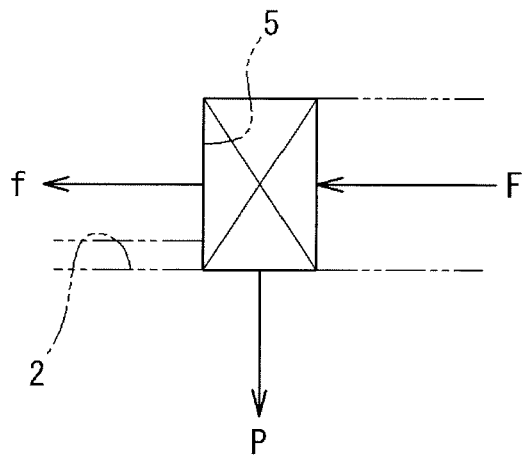
FIG. 7 shows a table, graphs, and equations of assistance in explaining a test conducted for comparing the tightening pressure transmission characteristic and the tightening pressure conversion characteristic in Example and Conventional Example.
Figure 8:
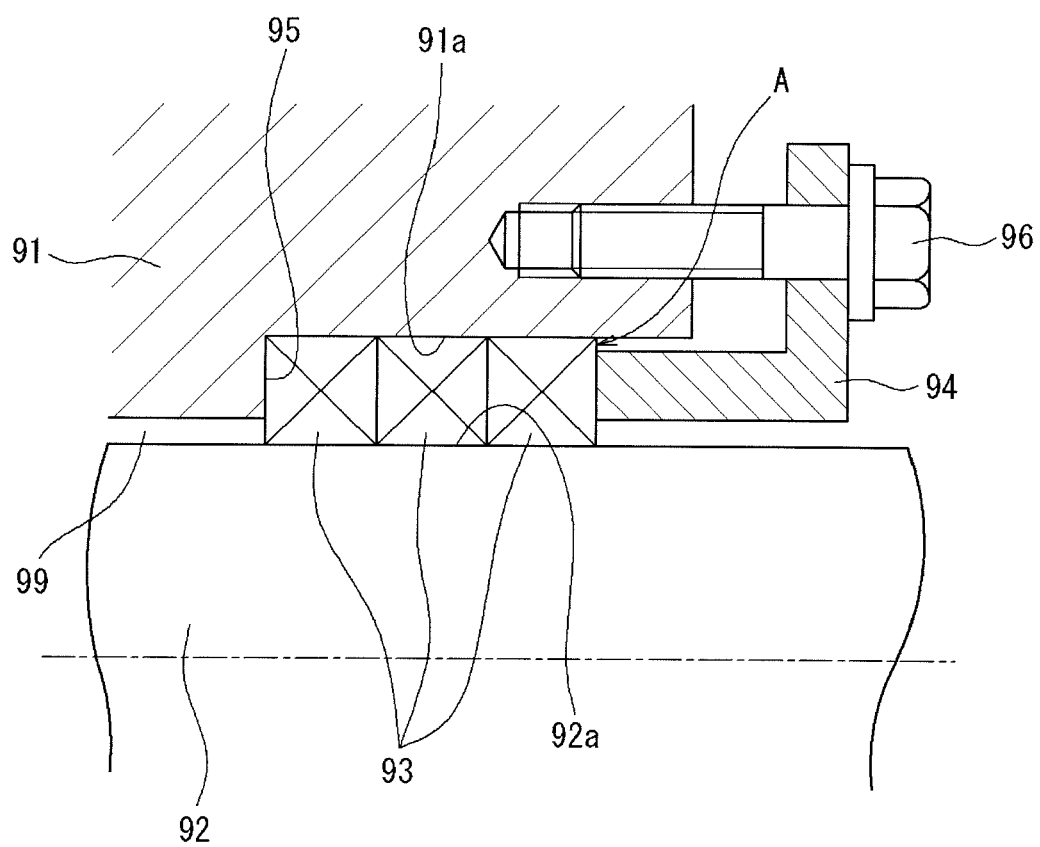
FIG. 8 is a cross-sectional view of part of a fluid apparatus in which conventional gland packings are used as sealing devices.

FIG. 7 shows the test results of the tightening pressure transmission characteristic and the tightening pressure conversion characteristic. The tightening pressure transmission characteristic (transmission percentage) is the ratio (f/F) between contact pressure F when one side surface in the axial direction of the gland packing is tightened by the tightening member 4 and contact pressure f on the other side surface in the axial direction of the gland packing caused by contact pressure F. The direction of contact pressure F and the direction of contact pressure f coincide with each other.

The tightening pressure conversion characteristic (conversion percentage) is the ratio (P/F) between contact pressure F when one side surface in the axial direction of the gland packing is tightened by the tightening member 4 and contact pressure P on the inner peripheral surface of the gland packing caused by contact pressure F. The direction of contact pressure F and the direction of contact pressure P are orthogonal to each other. The tightening pressure conversion characteristic is an index which indicates how large the tightening force in the axial direction can be caused as the tightening force in the diametrical direction with respect to the shaft 2.

The tightening pressure transmission characteristic is 85.5% in Example, and is 70.2% in Conventional Example. The tightening pressure conversion characteristic is 68.1% in Example, and is 55.3% in Convention Example. According to this result, the percentage in which the tightening force in the axial direction is converted to the tightening force in the diametrical direction is higher in Example than in Conventional Example.

That is, even when the tightening force in the axial direction is the same in Conventional Example and Example, the contact pressure (sealing contact pressure) onto the shaft 2 can be higher in Example than in Conventional Example.

As described above, from the results obtained by comparing the performance of FIGS. 6 and 7, the gland packing in Example has high rigidity, and can prevent abnormal deformation. In addition, the gland packing in Example can efficiently convert the tightening force in the axial direction to the tightening force in the diametrical direction onto the shaft 2 on the inner peripheral side. Therefore, the gland packing can have high sealing ability.

In the embodiments, the packing base material 11 including the band-like flat braid is shaped into a ring by abutting the longitudinal ends of the packing base material 11 so that the width direction thereof is parallel with the packing axial direction, and is then compressed in the axial direction, whereby the packing base material 11 is overlappedly folded in the packing axial direction, with the longitudinal direction of the packing base material 11 as the direction of the folding lines. The present invention is not limited to the form in which the gland packings have a uniform cross section in the circumferential direction and are aligned to be overlappedly folded in a serpentine shape. It suffices that the packing base material 11 is compressed and overlappedly folded in the width direction. For example, the gland packings which are compressed and overlappedly folded are not required to have a uniform cross-sectional shape in the circumferential direction, and are not required to be aligned in a serpentine shape.

Further, in the embodiments, the packing base material 11 including the band-like flat braid is shaped into a ring, and is then compressed in the width direction. However, the packing base material 11 including the flat braid may be compressed in the width direction so as to be bar-like, and be then shaped into a ring.

The gland packing 3 and the packing set of the present invention may have other forms within the scope of the present invention without being limited to the illustrated forms. In the embodiments, the packing set has three gland packings 3 aligned in the packing axial direction. However, the number of the gland packings 3 is not limited. For example, five gland packings 3 may be aligned in the axial direction.

In addition, the gland packing 3 of the present invention is applicable as the sealing device of a fluid apparatus other than a valve and a pump. In particular, the gland packing 3 of the present invention is suitable to an apparatus having small annular space A since the thin band-like packing base material 11 is overlappedly folded according to the shape of annular space A to have a predetermined shape.

REFERENCE SIGNS LIST

3: GLAND PACKING
11: PACKING BASE MATERIAL
12: FLAT BRAID
12*a*: END
13: YARN
14: FOLDING LINE
C: CENTER LINE
K: TRACK

The invention claimed is:

1. A gland packing comprising:
    a band-like flat braid of a predetermined length and comprising a plurality of yarns braided together along one track and along one surface,
    the band-like flat braid having a height, opposing edges defining a width and opposing ends defining a length, the band-like flat braid having a first surface between said opposing edges and opposing ends and a second surface opposing the first surface, the band-like flat braid being compressed and overlappedly folded in a width direction thereof to form the gland packing, the gland packing having at least one folding line, the at least one folding line being generally perpendicular to a direction that corresponds to a width direction of the band-like flat braid.

2. The gland packing according to claim 1, wherein the packing base material is shaped into a ring and is overlappedly folded in a packing axial direction, with a longitudinal direction thereof as a direction of the at least one folding line.

3. The gland packing according to claim 2, wherein the packing base material has at least two folding lines, and is overlappedly folded in its entirety.

4. A packing set comprising:
    a plurality of the gland packing of claim 1 packed in a packing axial direction.

5. The packing set according to claim 4, wherein abutted longitudinal ends of the packing base materials of a pair of gland packings adjacent to each other in an axial direction are apart from each other in the circumferential direction about the center line of the packings.

* * * * *